United States Patent Office 3,531,766
Patented Sept. 29, 1970

3,531,766
OVERLOAD INDICATOR FOR VEHICLES
Leo Henzel, North Miami Beach, Fla., assignor to Techmatic Corporation, New York, N.Y., a corporation of Delaware
Filed Sept. 27, 1967, Ser. No. 671,036
Int. Cl. B60q 1/00
U.S. Cl. 340—52                        6 Claims

ABSTRACT OF THE DISCLOSURE

An overload indicator for trucks and the like comprising an electromagnet, a magnetically operated switch, a relay and indicating circuit means. Either the magnet or the switch is mounted on an axle and the other is mounted on the body adjacent to the axle-mounted unit. Excessive loading of the vehicle will compress its springs sufficiently to bring the magnet and the switch close enough to each other to allow the field of the electromagnet to actuate the switch. The switch is connected to the coil of a relay in such a way that operation of the switch will actuate the relay, which is connected to the electromagnet, to change the condition of the electromagnet, causing it to reverse the condition of the switch, and thereby the relay, to produce an oscillating indication of an overloaded condition.

---

This invention relates to an electrical overload indicator using an electromagnet and a magnetically operated switch controlled by and controlling the electromagnet.

Excessive weight of trucks and other road vehicles is one of the major sources of damage to paved roads, and as a result many states have passed laws restricting the maximum weight of road vehicles. Various means are used to determine violations of these laws including placing weighing stations at particular locations on major highways, but such weighing stations are quite expensive and are permanent installations at fixed locations. It is possible to avoid the weighing stations in many instances or to drive by them at hours when it is known that such stations will be closed. As a consequence, a great many excessively heavy vehicles travel the roads without being detected.

It is one of the objects of the present invention to provide an indicator to be fixedly attached to a vehicle to indicate whether or not the weight of the vehicle exceeds predetermined figure.

It is a further object to provide simple visual and audible indications of overload and to provide an indicator which can be operated upon demand but need not be operated continuously.

Further objects will become apparent from the following specification in which the drawings.

Figure 1:
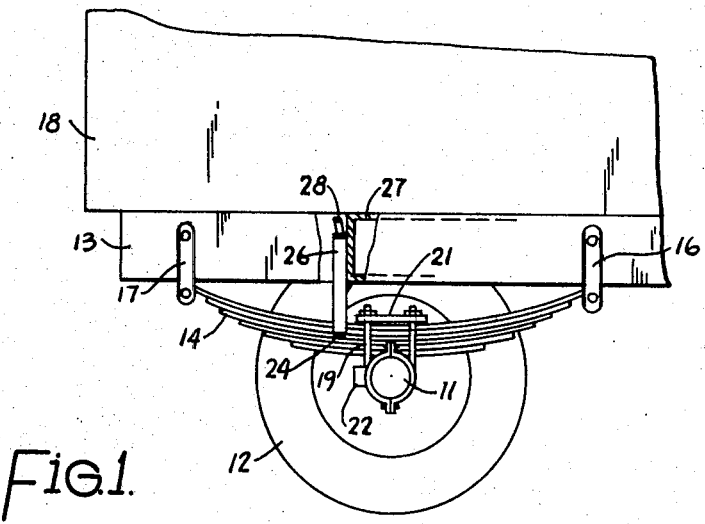
FIG. 1 shows a portion of a vehicle equipped with an overload indicator according to the present invention.

FIG. 1 shows only a part of a typical road vehicle which may be a truck or trailer with any number of axles and wheels. In the simple embodiment shown, there is only a single axle 11 and wheel 12 connected to the frame 13 of the vehicle by a customary semielliptic spring 14 held by shackles 16 and 17. A body for the vhicle is indicated by reference numeral 18. The axle 11 is tied to the spring 14 by means of a U-bolt 19 attached to a plate 21.

The overload indicator members in FIG. 1 include an electromagnet unit 22 attached by means of a circular bracket 23 to the axle 11 and a magnetically operated switch unit 24 attached by means of a bracket 26 to the frame 13 of the vehicle. It is important that the electromagnet unit 22 and the magnetically operated switch unit 24 not be adjustable with respect to each other once they have been installed on the vehicle and so it may be desirable to weld the bracket 26 to a cross member 27 shown in a broken away portion of the frame 13. At the upper end of the bracket 26 wires 28 of the magnetically operated switch unit 24 are carried in a suitable cable to the control section of the indicator which is not shown in this drawing.

Figure 2:
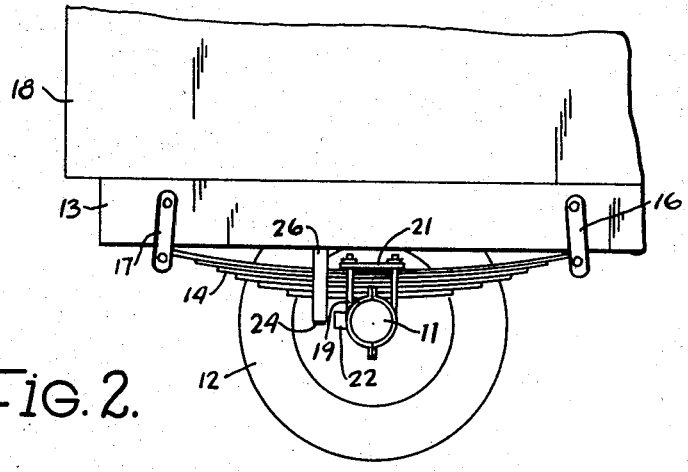
FIG. 2 shows the vehicle of FIG. 1 in an overloaded condition.

FIG. 2 shows the same components as FIG. 1 but under conditions of a heavy load in the body 18 causing the spring 14 to flatten out thereby dropping the frame 13 and the magnetically operated switch unit 24 to a position close to the electromagnet unit 22. The magnetically operated switch unit and the electromagnet unit are fixed relative to each other so that the field of the electromagnet will operate the magnetically operated switch when the spring 14 is flattened by a predetermined amount corresponding to a certain load on the vehicle. It is essential that even in this flattened condition of the spring 14 the magnetically operated switch unit 24 not physically touch the electromagnet unit 22 because there must be freedom for the axle 11 to bounce up and down in the normal way due to imperfections in the pavement. Even if the load for which the indicator is set is the maximum load that can be carried by the vehicle and corresponds to the maximum permissible flattening of the spring 14, the upper of the two units, in this case the magnetically operated switch unit 24 must be slightly displaced from a position directly over the lower unit which in this case is the electromagnet unit 22. It should be understood that the relative positions of the electromagnet unit 22 and the magnetically operated switch unit 24 could be reversed but it is preferable that they be arranged as shown because the unit attached to the axle 11 is subjected to greater shocks and the electromagnet is better able to withstand shocks than the magnetically operated switch.

Figure 3:
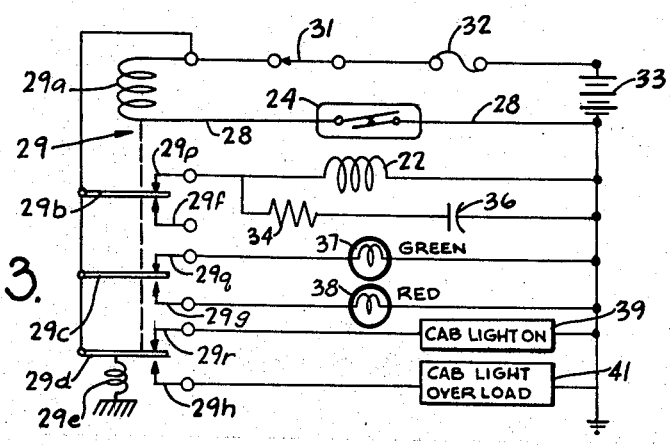
FIG. 3 is a circuit diagram of the indicator apparatus of the invention.

The electrical circuit of the indicator is shown in FIG. 3 in which the magnetically operated switch unit 24 is shown as a read switch and the electromagnet unit 22 is shown adjacent to the switch. The switch 24 is connected in series with the coil 29a of a relay 29, the on-off switch 31 and a fuse 32 to the terminals of the battery 33 which normally is the main battery of the vehicle but may, if desired, be an auxiliary battery. The relay 29 has armatures 29b–29d which normally are resiliently biased by a spring 29e against a set of normally closed contacts 29f–29h but which are drawn up against a set of normally open contacts 29p–29r when the coil 29a is energized.

The electromagnet 22 is connected in series between the normally open contact 29p and the common, or grounded, negative terminal of the battery 33. A filter comprising a resistor 34 and a capacitor 36 is connected across the coil of the electromagnet 22 to smooth out electrical impulses produced when the coil is rapidly energized and deenergized.

A green indication light 37 which indicates that the vehicle is not excessively loaded is connected between the normally open contact 29q and the common grounded terminal of the battery 33 while a red light 38, which indicates overload, is connected between the normally closed contact 29g and the common terminal of the battery. An additional set of lights, which may be mounted outside of the vehicle may be provided if desired to give external indication of the condition of weight in the vehicle. These external lights are indicated "cab light on" 39 which is connected between the normally open contact 29r and the common terminal of the battery 33 while another light indicated as "cab light overload" is connected between the normally closed contact 29h and the common terminal of the battery.

In operation, when the switch 31 is closed, the circuit to energize the coil 29a is completed and the armatures 29b–29d will be drawn to the normally open contacts 29p–29r if the vehicle is not overloaded. In this condition the electromagnet 22 is energized as well as the green indicator light 37 and the "cab light on" light 39. However, if there is an excessive load in the vehicle so that the electromagnet 22 is close enough to the switch 24 to permit the magnetic field of the former to operate the latter, the circuit of the relay coil 29a will be opened allowing the armatures 29b–29d to drop to their "off" positions. In this case the armature 29c will make contact with the normally closed contact 29g and energize the red light 38 which indicates an overload and the armature 29d will engage the normally closed contact 29h lighting the external light 41.

The armature 29b will drop into contact with the normally closed contact 29f which in this embodiment is not connected to anything. This movement of the armature 29b opens the circuit to the electromagnet 22 and deenergizes it. As a result, the magnetically operated switch 24 will be allowed to return to the closed position so that the coil 29a will again be energized and attract the armatures 29b–29d. As soon as this happens, the armature 29b will again complete the circuit to the electromagnet 22 via the normally open contact 29p and the whole cycle will begin again. The result is the chattering of the relay which forms an audible indication of overload and a flashing of the lights, particularly the red indicator light 38 and the external light 41. The frequency of chattering depends on the degree of overload—the greater the overload, at least up to a certain amount, the higher the frequency of change between the two conditions of the switch 24. The circuit shown in FIG. 3 includes fail-safe provisions. For example, if the coil 29a of the relay burns out, the armatures 29b–29d will remain connected with the normally closed contacts and both the overload warning light 38 and the external warning light 41 will be on.

While the invention has been described in terms of a specific embodiment including a circuit in which the field of the electromagnet 22 causes the switch 24 to open, other embodiments may occur to those skilled in the art including, in particular, but without limitation, a converse circuit arrangement in which the field of the electromagnet 22 closes the switch 24 but the elements of the circuit are so connected as to retain the oscillating operation described above. The true scope of the inven- 8. A ceramic component in accordance with claim 5, um, and a rare-earth aluminate.

1. An overload indicator for a vehicle having wheels, a body, an axle for at least one of said wheels, and a spring resiliently joining said axle to said body, said indicator comprising:
   an electro-magnet unit;
   a magnetically operated switch unit, one of said units being attached to said axle and the other of said units being attached to said body adjacent to said one unit to move closer thereto as additional load is placed on said body; and
   a relay comprising a coil section connected to said switch to be controlled thereby and armature and contact means connected in series with said electro-magnet unit to control the current therethrough.

2. The overload indicator of claim 1 comprising additional armature and contact means; and
   visual indicating means connected to said additional armature and contact means to be controlled thereby to indicate whether or not said vehicle has greater than a predetermined load.

3. The overload indicator of claim 1 in which said magnetically operated switch is normally closed and is opened by the magnetic field of said electro-magnet.

4. The overload indicator of claim 3 comprising visual indicator means; and
   additional armature and contact means on said relay connected in series with said visual indicator means, said additional armature and contact means being connected in parallel with said first named armature and contact means whereby said visual indicator means provide a flickering indication of excessive load on said vehicle.

5. The overload indicator of claim 1 in which said electro-magnet unit is attached to said axle and said indicator unit comprises a bracket fixedly attached to said body.

6. The overload indicator of claim 1 in which one of said units is mounted almost, but not quite, over the other of said units and moves down alongside said other of said units as additional load is placed on said body.

References Cited

UNITED STATES PATENTS

| | | | |
|---|---|---|---|
| 2,842,633 | 7/1958 | Roach | 200—85 |
| 3,251,961 | 5/1966 | Wintriss | 335—202 XR |
| 3,445,796 | 5/1969 | Spiroch et al. | 335—205 |

ALVIN H. WARING, Primary Examiner

U.S. Cl. X.R.

177—136; 200—85; 335—17; 340—272